United States Patent
Holberg et al.

[11] 3,877,011
[45] Apr. 8, 1975

[54] DUAL CHANNEL ADAPTABLE MOVING TARGET PROCESSOR

[75] Inventors: Dieter E. Holberg, Pacific Palisades; Robert F. Quinn, Los Angeles; Milton E. Radant, Encino, all of Calif.

[73] Assignee: Hughes Aircraft Company, Culver City, Calif.

[22] Filed: Oct. 26, 1967

[21] Appl. No.: 679,288

[52] U.S. Cl. ................................................. 343/7.7
[51] Int. Cl. .............................................. G01s 9/42
[58] Field of Search ..................................... 343/7.7

*Primary Examiner*—Malcolm F. Hubler
*Attorney, Agent, or Firm*—W. H. MacAllister; Lawrence V. Link, Jr.

[57] ABSTRACT

An airborne moving target indicator system which includes, in combination with a pulsed radar system, a digital moving target processor comprising a digital ground clutter rejection filter which is programmed to adapt to the varying frequency characteristics of received radar clutter signals. The rejection filter superimposes with alternate signs a minimum number of optimumly weighted digitized signal returns, for each of a plurality of discrete range intervals, so as to achieve a desired level of clutter signal rejection. The processor further includes a digital video integrator that is programmed as a function of the predicted time on target so as to optimize the target-to-noise ratio of the output signal from the rejection filter. A digital mean-level threshold detector is coupled to the output circuit of the integrator and is programmed as a function of the number of integrated filter outputs to maintain a selected false alarm rate.

17 Claims, 15 Drawing Figures

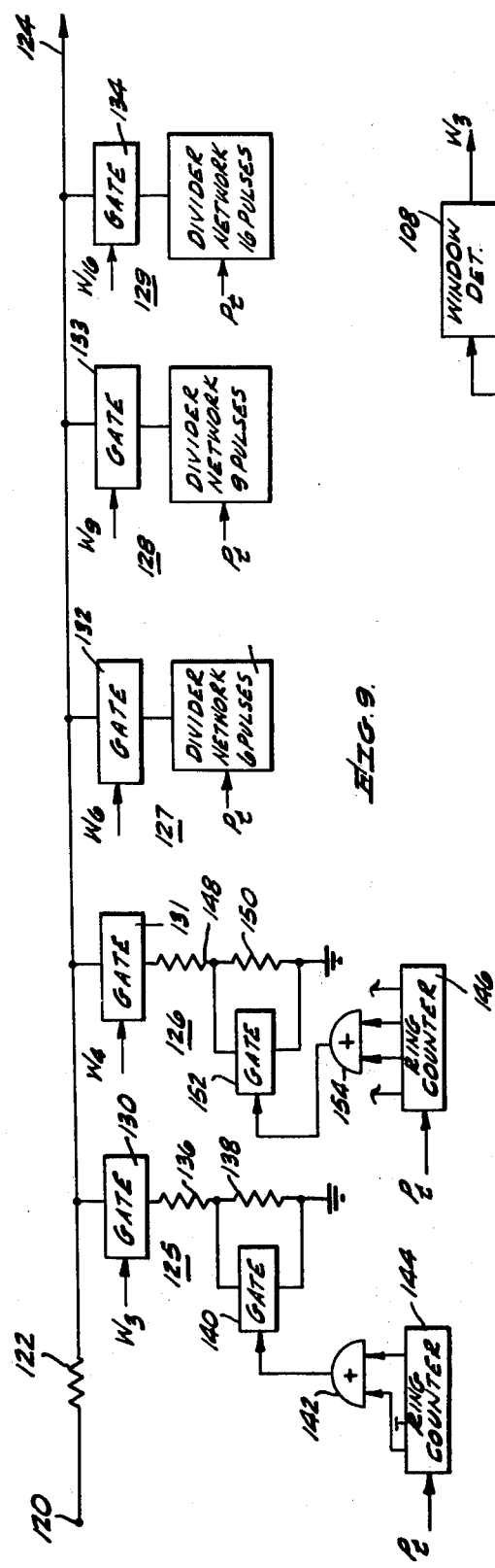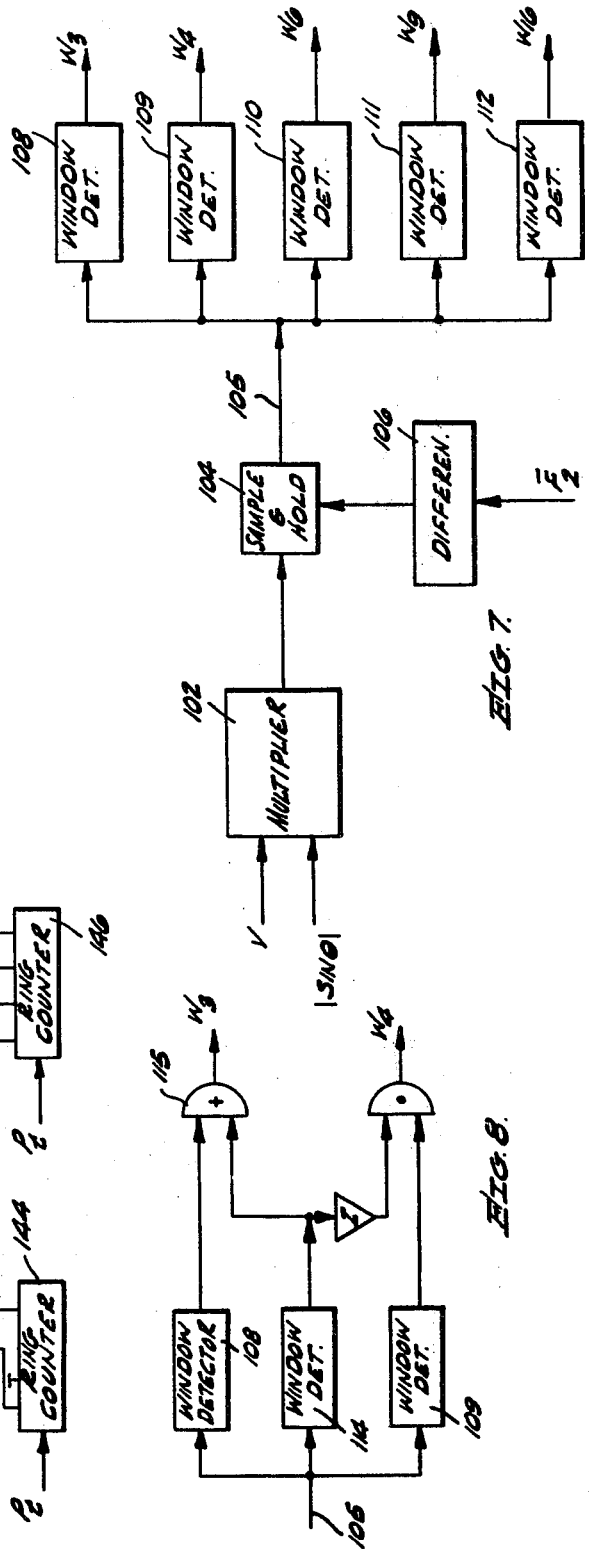

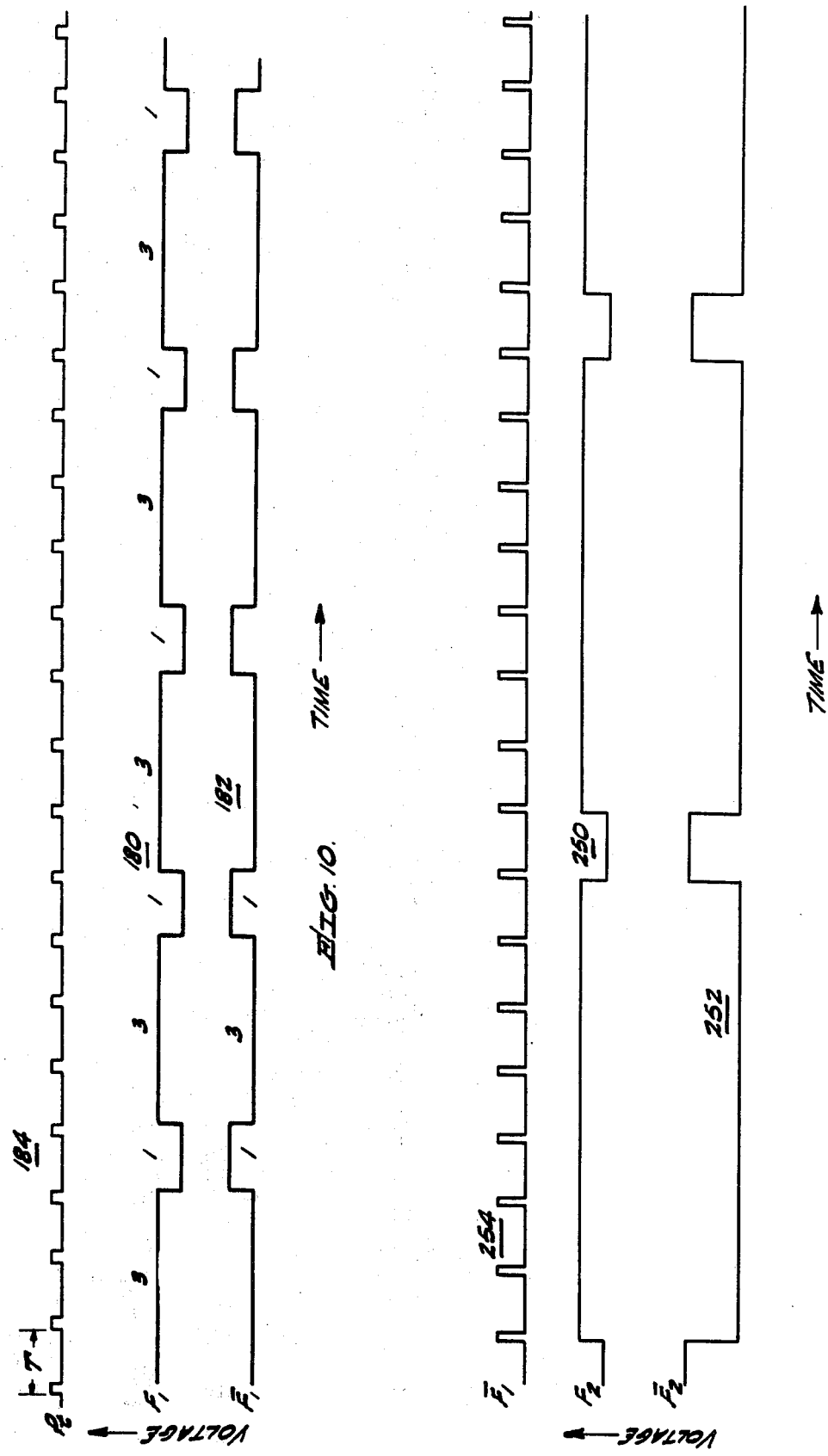

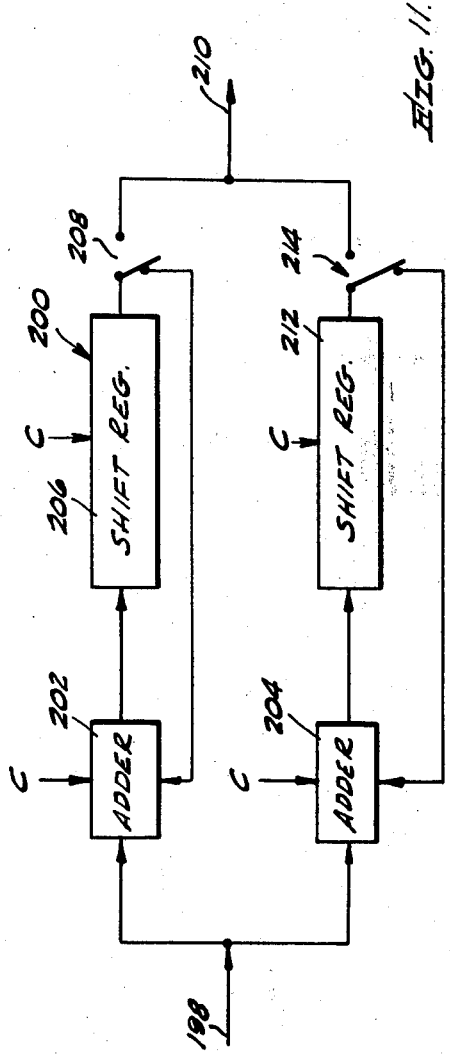
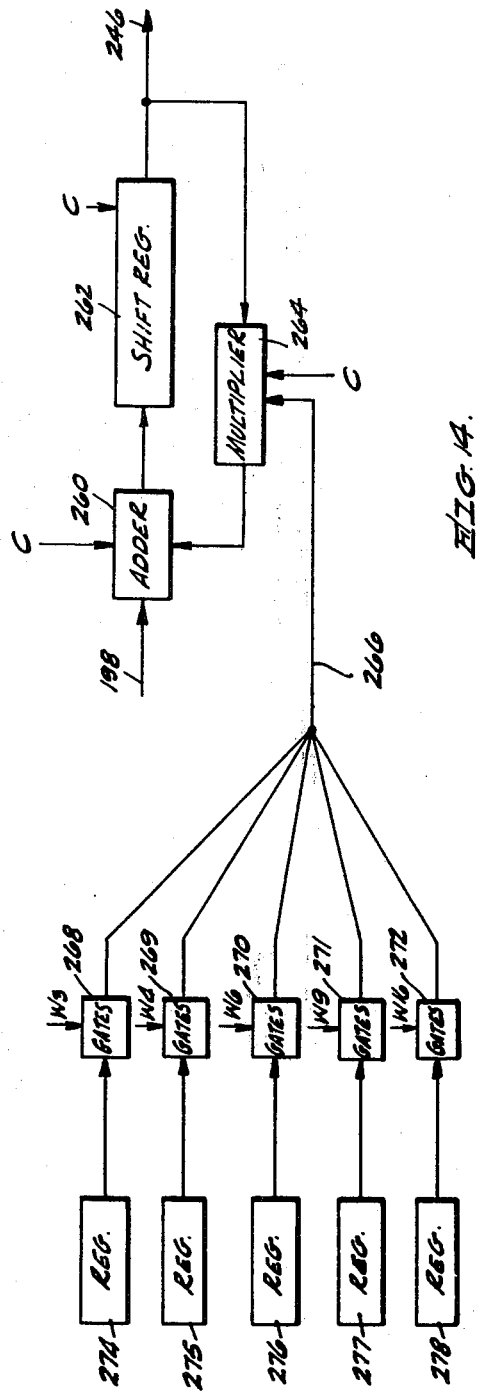

DUAL CHANNEL ADAPTABLE MOVING TARGET PROCESSOR

BACKGROUND OF THE INVENTION

This invention relates to signal processors and particularly to novel and improved moving target signal processors which are adaptable to the spectral characteristics of ground clutter signals.

Moving target signal processors are devices for enhancing the detection of moving target signals in the presence of ground returns of significantly greater power. Moving target detection enhancement is usually achieved by frequency filtering techniques based on the difference in doppler frequency shift between stationary and moving targets.

Numerous types of moving target signal processors have been utilized in the prior art. One type of prior art processor is characterized by the classical single or double delay line clutter (return signal from fixed targets) canceller and the related cononical configuration described in section 4.2 of the text "Introduction to Radar Systems" by M. I. Skolnik, published by McGraw Hill Book Company, Inc., New York, N.Y. The just mentioned moving target processor types generally include acoustic delay lines and encounter performance degradation caused by drift of component parameters due to environmental conditions or aging. Further, the frequency response of this type of processor is not readily adaptable to programming as a function of the spectral characteristics of the received signal from fixed targets (clutter signals).

A second general type of moving target processor employs an analog storage medium such as the surface of a storage tube in combination with a bank of analog filters. This type of processor may also encounter performance degradation due to drift in component parameters and is further restricted by dynamic range limitations (the range between the largest and smallest signal amplitude that can be processed) inherent to the physical properties of the storage medium.

SUMMARY OF THE INVENTION

Briefly the system of the subject invention is an improved signal processor that may be utilized in combination with a pulsed radar, for example, to achieve improved clutter signal rejection with a minimum of equipment complexity. The processor of the subject invention includes a program controller, a weighting function generator, an analog-to-digital converter, a digital clutter rejection filter, a digital video integrator and a digital mean-level threshold detector. All of the just mentioned units with the exception of the analog-to-digital converter are programmed to change their characteristics in accordance with the predicted spectral characteristics of the received ground clutter signals as determined by the program controller unit.

Received radar signals are amplitude weighted (processing scale factor is varied) in the weighting function generator as a function of the predicted clutter spectrum. The weighted received signals are then sampled and quantized into multi-bit digital words in the analog-to-digital converter. The sampling sequence is timed so that the received signals for a given range interval (range bin) are synchronously sampled each radar transmission period. The digital clutter rejection filter sequentially superimposes with alternate signs N data words corresponding to each one of a plurality of range bins during successive cycles of a delay means such as a multi-word shift register. The number N is programmed as a function of the predicted clutter signal frequency spread and is kept to a minimum, compatible with the desired level of clutter rejection, by input amplitude weighting of the received radar signal prior to the analog-to-digital conversion. The clutter rejection resulting from superposition of the digitized returns from each range bin for N successive transmission periods is thus reduced to a simple arithmetic operation involving only subtraction and utilizes only a single digital delay device with minimum digital storage capacity of but a single digital word per range bin.

The digital clutter rejection filter produces one series of output data words (one data word for each range bin) every N interpulse periods, and the output words are coupled to the digital video integrator. In response to the program control unit, the video integrator is programmed to integrate the proper number of filter output signals to maximize the signal-to-noise ratio. The output signal from the video integrator is applied to a digital mean-level threshold detector which forms a variable threshold level from the average of the signal amplitudes contained in M range bins symmetrically adjacent to a given range bin being examined therein, as well as a function of the number of filter outputs integrated. If the contents of the given range bin exceeds the threshold level, the mean-level detector generates an output signal representative of the detection of a moving target.

The moving target processor in accordance with the subject invention provides essentially constant clutter rejection for clutter signals of varying spectral width. The clutter rejection filter of the subject invention utilizes a simplified digital mechanization which merely requires an accumulation of a minimum number of optimally weighted signal returns and which utilizes minimum storage capacity and provides increased operational reliability. The processor of the subject invention is basically a digital device and as such is free from performance degradation caused by component parameter drifts and further does not require numerous alignment adjustments as do the systems of the prior art. Also the moving target processor of the subject invention does not have dynamic range limitations inherent in the prior art analog processors using storage tubes and filter banks, because in the processor of the subject invention the precision of the binary words may be freely chosen to provide a required degree of dynamic range.

Therefore, it is an object of the present invention to provide an adaptive moving target processor with improved performance and reliability.

Another object of this invention is to provide an adaptive moving target processor which produces essentially constant clutter signal rejection for clutter signals of varying spectral widths.

A further object of this invention is to provide a moving target processor having a simplified digital mechanization that requires only a single digital delay means with a minimum digital storage capacity, thus permitting fabrication thereof at circuits minimum cost.

A still further object of this invention is to provide a moving target processor that utilizes adaptive signal amplitude weighting to provide essentially constant clutter rejection while requiring the minimum number of signal samples.

A still further object of this invention is to provide a moving target processor comprising a digital clutter rejection filter and a digital video integrator, said units being programmed in response to the predicted clutter spectral characteristics so as to provide essentially constant clutter rejection while maximizing the signal-to-noise ratio.

Still another object of this invention is to provide a moving target processor which may be programmed to respond to predicted clutter spectral characteristics to provide essentially constant clutter rejection, maximum signal-to-noise ratio and an essentially constant false alarm rate.

BRIEF DESCRIPTION OF THE DRAWINGS

The novel features which are believed to be characteristic of the invention, both as to its organization and method of operation together with further objects and advantages thereof will be better understood from the following descriptions considered in connection with the accompanying drawings in which like characteristics refer to like parts and in which:

FIGS. 7 and 8 are block and schematic diagrams of a program controller unit of the moving target processor shown in FIG. 5;

FIG. 9 is a block and schematic diagram of a weighting function generator that may be utilized in the moving target processor of FIG. 5;

FIG. 10 is a schematic diagram of voltages versus time waveforms, for explaining the clutter rejection filter of FIG. 6;

FIG. 11 is a block diagram of a first type of digital integrator that may be utilized in the moving target processor of FIG. 5;

FIG. 13 is a schematic diagram of voltages versus time waveforms for explaining the operation of the digital integrator of FIG. 12;

FIG. 14 is a block diagram of a third type of digital integrator that may be utilized in the moving target processor of FIG. 5;

DESCRIPTION OF THE PREFERRED EMBODIMENT

Figure 1:
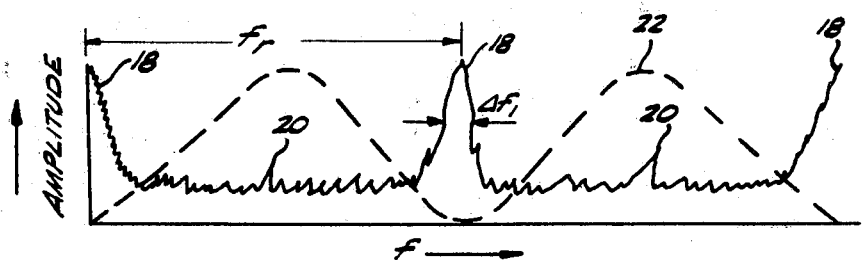
FIGS. 1 and 4 are schematic diagrams of power amplitude versus frequency of the received radar signal processed by the moving target processor of the subject invention.

The principles of the subject invention will be better understood by first referring to FIG. 1, which shows the power amplitude versus frequency spectrum of a received signal from a given range interval (range bin) for an airborne pulsed radar system that illuminates both stationary targets (e.g., the ground) and moving targets. The clutter signal power spectrum (ground return energy) may be centered at frequencies which are multiples of the radar pulse repetition rate ($f_r$) and has a spectral width, $\Delta f$, approximately equal to $2V/\lambda$ B sin $\theta$ for $\theta$ not equal to zero and where: V is the velocity of the platform aircraft upon which the radar system is mounted; $\theta$ is the look angle of the radar antenna off of the flight path (velocity vector) of the aircraft and B is the 3db beamwidth of the radar antenna.

Figure 2:
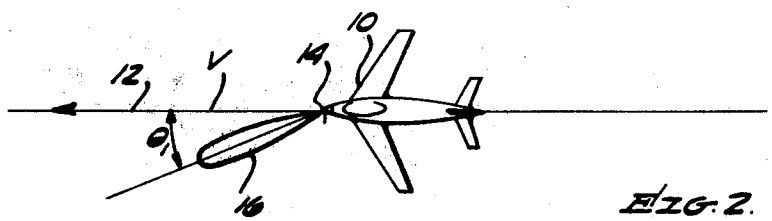
FIGS. 2 and 3 are perspective views of aircraft flight profiles associated with the signal spectra shown in FIGS. 1 and 4, respectively.

FIG. 2 shows an aircraft 10 flying at a velocity (V) along a flight path 12. An antenna 14 mounted on the aircraft transmits and receives pulses of energy in a beam pattern 16 at an angle $\theta_1$ relative to the flight path 12. It may be assumed that the power spectrum shown in FIG. 1 is representative of the received signal energy from a given range bin containing a moving target and stationary targets (clutter). Therefore the spectral width, $\Delta f_1$, of the clutter signal (designated 18 in FIG. 1) is equal to $2V/\lambda$ B sin $\theta_1$. The signal representative of a moving-target return is designated by the numeral 20 in FIG. 1, and, as is known to those skilled in the art, the difference in the spectral position between the moving-target signal and the stationary target signal is due to the difference in the doppler frequency shift resulting from the relative velocity between the moving target and the stationary targets.

Still referring to FIG. 1, one of the primary functions of a moving target processor is to reduce the clutter power so that the target signal may be reliably detected by frequency filtering with a device whose frequency responds would ideally be essentially the inverse of the clutter spectrum as indicated by the dash line 22 of FIG. 1.

Figure 3:
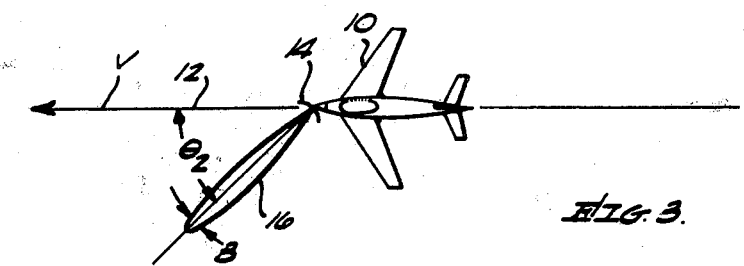
Figure 4:
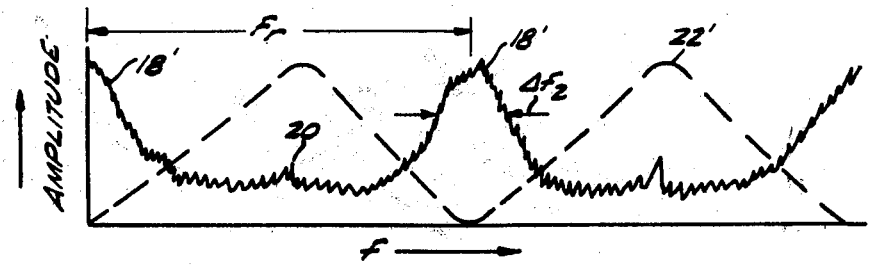

Referring now to FIGS. 3 and 4, the aircraft 10 is in a flight condition identical to that shown in FIG. 2 except that the radiated beam 16 is directed at an angle $\theta_2$ relative to the flight path 12. FIG. 4 shows a simplified received signal spectrum for the range bin containing the moving target. The spectrum is identical to that shown in FIG. 1 except that the clutter signal spectral width $\Delta f_2$, equal to $2V/\lambda$ B sin $\theta_2$, has increased. It is important to note that, for a clutter rejection filter optimized for the received clutter spectrum, the frequency response of the rejection filter (22 and 22') would have to adapt as the angle $\theta$ or the velocity V is varied. Also as will be explained in detail subsequently, the frequency response of the digital filter is dependent upon the number of returns superimposed for each of the range bins processed, as well as on the relative amplitude weighting factor applied to each return. Further, for each range bin processed, the smaller the number of returns required to produce a single clutter-rejection filter output sequence (one output data word for each range bin), the more of such filter outputs are available for subsequent integration processing during the time the target is within the transmitting antenna's beamwidth. Therefore, the smaller the number of returns required for the clutter-rejection filter the greater is the signal-to-noise ratio improvement obtainable by integration.

The subject invention will now be explained with reference first directed primarily to FIG. 5, which shows the moving target processor of the invention in block diagram form in combination with a pulsed radar 24. The radar system 24 includes a local oscillator 26 which generates a radio frequency signal that is coupled to a mixer 28. An intermediate frequency oscillator 30 generates an intermediate frequency signal that is supplied to a second input terminal of the mixer 28 wherein it is heterodyned with the radio frequency signal produced by the local oscillator 26. The resultant output signal, at a frequency that is the sum of the frequencies of the local oscillator and the IF oscillator, is applied to an input terminal of a gating circuit 32. A conventional clock generator 34 provides a series of pulses at a high repetition rate such as, for example, 2.5 megacycles per second. These clock pulses are counted down by the conventional countdown circuit 36 to a lower frequency to provide transmitter synchronization pulses ($P_t$) which may be at a frequency of 2,000 cycles for example. The output signal from the countdown circuit 36 ($P_t$) is applied to a monostable multivibrator 38, commonly referred to as a one-shot (O/S), which provides a transmitter trigger pulse to the gate circuit 32; said transmitter trigger pulse being of a predetermined selected pulse duration such as, for example, 400 nanoseconds. In response to the trigger pulse, the gate 32 transmits a burst of the RF frequency signal from the mixer 28 to the power amplifier 40 wherein the RF signal is amplified and transmitted through the duplexer 42 to the antenna 14 wherefrom the energy is radiated into space.

A conventional antenna control unit 44 is mechanically coupled to the antenna 14 and in response thereto the antenna 14 is scanned in an azimuth plane about the flight path of the aircraft 10 (FIG. 2). The antenna control unit also provides the signals, $\theta$, $|\sin \theta|$, and $|\cos \theta|$ at output terminals 46, 48 and 50, respectively, where $\theta$ is the angle from the flight path vector in the azimuth plane.

A portion of the transmitted energy which is reflected from stationary and moving targets within the transmitted beamwidth is intercepted by the antenna 14 and coupled through the duplexer 42 to a mixer 52 wherein the received signal is heterodyned with the output signal from the local oscillator 26 to form an intermediate frequency signal that is amplified in the IF amplifier 54 and then applied to an IF mixer 56.

A motion compensation circuit 58, as is well known in the art, produces a signal $f_d$ which has a frequency proportional to $2V|\cos \theta|/\lambda$. The signal V is proportional to the velocity of the aircraft 10 (FIG. 2) and is applied to the motion compensation unit 58 from an air data computer 60. The signal $|\cos \theta|$ is applied to the motion compensation unit 58 from the antenna control unit 44. The signal at a frequency $f_d$ from the output terminal of the motion compensation unit, is heterodyned in the IF mixer 56 with the output signal of the IF amplifier 54 and the output signal from the mixer 56, which is the difference frequency from the input signals applied thereto, is coupled in parallel to a pair of synchronous phase detectors 62 and 64. Phase detector 64 has the output signal from the IF oscillator 30 applied thereto as a reference, and phase detector 62 has the output signal of the IF oscillator applied as a reference thereto after it has been phase shifted 90 degrees in a conventional phase shifter 66.

The output signal from the phase detector 64 designated "in-phase video" is processed by a weighting function generator 70 and then applied to a suitable conventional analog-to-digital converter 72. The weighting function generator 70 changes the scale factor of the in-phase video applied to the analog-to-digital converter 72 at the beginning of each interpulse period of the radar 24, according to the programmed sequence which is controlled by a program controller 74. The weighting function generator and the program controller will be explained in greater detail subsequently as their functions in the moving target processor will be more clearly understood after the clutter rejection filter 78 has been described.

The analog-to-digital converter 72 samples the in-phase video each clock period (for each range bin) to sequentially form a series of binary words representative of the amplitude of the in-phase video signal during each of a plurality of clock periods. In the embodiment of the invention described herein, the transmission synchronization pulse $P_t$ is counted down from the clock pulses and so the clock pulses are synchronized with the transmission period. Therefore each transmission pulse period, a given clock pulse sample corresponds to a particular range interval of the received video. For example, if the countdown circuit 36 counts down by a factor of 1,250, then there are 1,250 range intervals which are sequentially quantized by the analog-to-digital converter 72. The precision of binary words, i.e. the number of parallel bits which are provided by the analog-to-digital converter 72, is dependent upon the desired dynamic range of the system, a typical value being an 8-bit word including the sign bit. The digitized output signal from the analog-to-digital converter 72 is coupled on a composite lead 80 (the multi-bit words having one single lead per bit associated therewith) to an input circuit 82 of the clutter reject filter 78.

The quadrature video from the phase detector 62 is processed by a weighting function generator 74 and by an analog-to-digital converter 76 in an identical manner to that just described for the in-phase video. The sequence of binary words, representative of the amplitude of the quadrature video signal during each of a plurality of range bin sampling intervals, is applied by composite lead (a plurality of separate conductors) 84 to an input circuit 86 of the clutter reject filter 78. It should be noted that the digital multi-bit parallel format words, representative of the amplitude of the quadrature video during a given range bin time, are applied to the clutter reject filter in a sequence that is timed so as to be repetitive each transmission pulse period. In the interest of clarity, throughout this specification digital words (plurality of bits) are coupled on composite leads shown as a single lead. However, it will be understood that all digital words are transmitted in a parallel format on a plurality of single leads which form the composite lead shown on the drawings herein.

Figure 6:
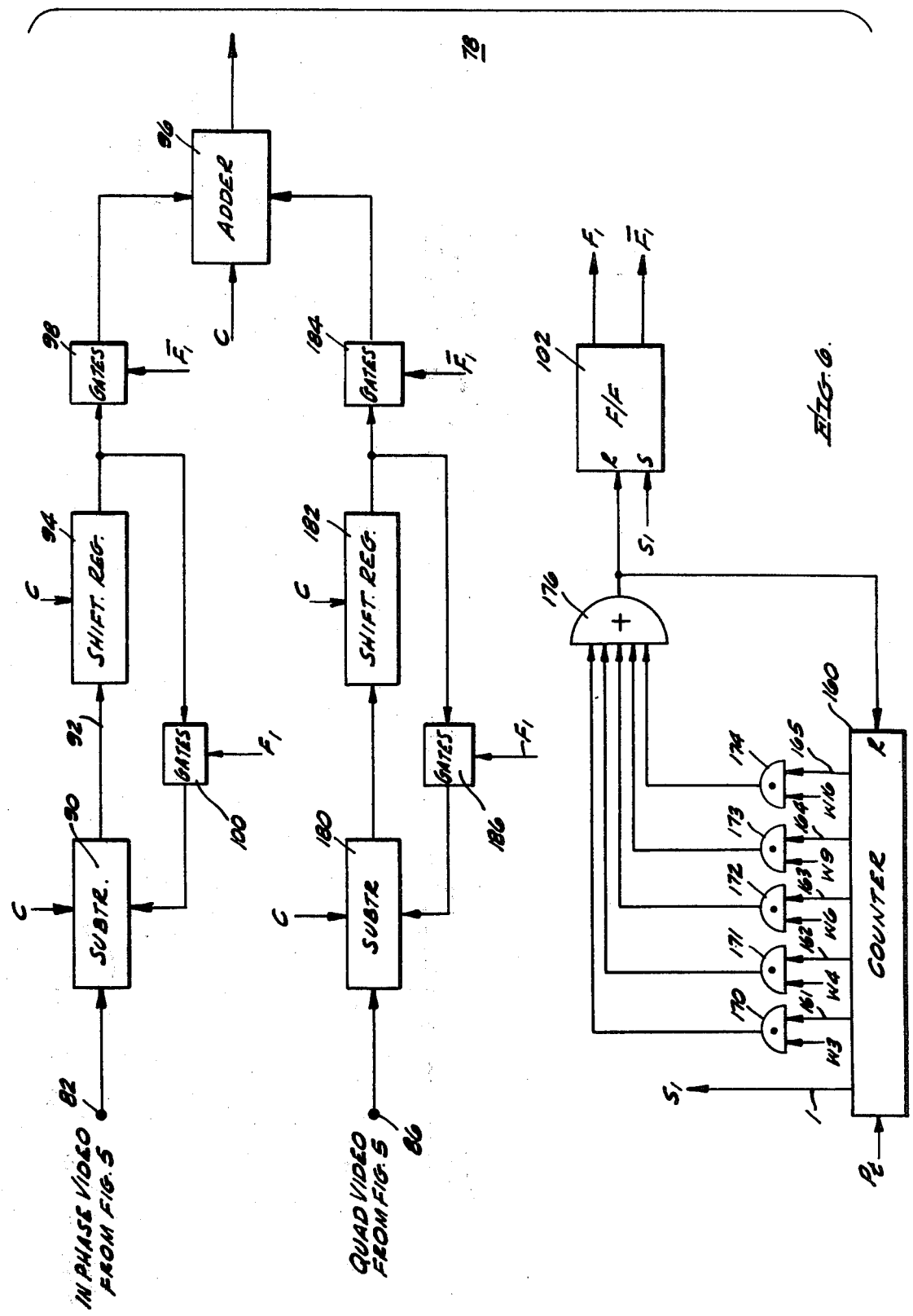
FIG. 6 is a block and schematic diagram of the new and novel clutter rejection filter of the moving target processor shown in FIG. 5.

Reference is now directed to FIG. 6 which shows the clutter rejection filter 78 in greater detail. The digitized in-phase video is applied from the input circuit 82 to a minuend input circuit of a conventional digital full subtractor 90. The difference output circuit of the subtractor 90 is coupled on a composite lead 92 to an input circuit of a multi-bit, multi-stage shift register or word shift register 94 which has the clock pulses applied to a shift control input circuit thereof. It is to be noted at this time that the word shift register 94 may include a plurality of shift registers operating in parallel such as eight shift registers each shifting bits of different significance of 8-bit words. Shift register 94, as is well known in the art, shifts a binary word from stage to stage each clock pulse with the binary word progressing from the input circuit towards the output circuit. It will be recalled that the analog-to-digital converter 72 samples the in-phase video once each range bin and produces a parallel digital word consisting, for example, of eight bits including sign bit representative thereof. Further, it will be recalled that the analog-to-digital converter has a sampling rate which is so timed that samples during subsequent transmission periods sample data from the same range interval with a fixed time (the radar's pulse repetition period) therebetween. The range bin size in terms of time is usually selected to be equal to or somewhat less than the duration of the transmitted radar pulse. For example, with a half-microsecond radar pulse (determined by the width of the output pulse of the one-shot circuit 38, FIG. 1) one range bin is typically approximately 400 nanoseconds or 200 feet. Since the analog-to-digital converter makes one conversion for each range bin, the maximum number of range bins depends on the pulse repetition frequency and the range bin size. With a pulse repetition frequency of 2,000 cycles per second for example, and a range bin size of 400 nanoseconds; approximately 1,250 separate range bins can be implemented. Therefore, the shift register 94 for example may consist of 1250 stages with each stage being adapted to contain eight binary information bits. The subtractor 90 may be any conventional arrangement such as a full adder and a network to change the subtrahend to a 2's complement prior to insertion into the adder.

The output signal from the shift register 94 (a sequence of binary words) is coupled either to a full added 96 or to the subtrahend input circuit of the subtractor 90 depending on the condition of gating circuitss 98 and 100. Gating circuits 98 and 100 each comprise a plurality of separate gates, for example AND gates, which respond to the signals $F_1$ or $\overline{F}_1$, respectively, to either pass or inhibit the bits of the parallel digital data word that is shifted out of the shift register 94. The signals $F_1$ and $\overline{F}_1$ are complementary signals generated by a flip-flop 102 so that the output words of the shift register 94 are applied exclusively either to the adder 96 or to the subtractor 90.

It will be recalled from prior discussions that the frequency response of the clutter reject filter (shown by curves 22 and 22' of FIGS. 1 and 4) results from subtraction of N subsequent returns from the same range bin. For increasing clutter frequency spread as measured by the quantity $|V \sin \theta|$ the number N is increased, however, N is always kept to the minimum compatible with the desired level of clutter rejection by optimumly amplitude weighting the received video in the weighting function generator 70 (FIG. 1). Therefore, normally the gates of the gating circuit 100 are closed and clutter rejection is accomplished in the loop consisting of the subtractor 90, the shift register 94 and the gating circuit 100, by a superposition with alternate signs of N subsequent returns from the same range bin. It will be apparent to those skilled in the art that the clutter rejection filter mechanization of FIG. 6 assumes that the motion compensation unit 58 of FIG. 1 centers the received clutter spectrum at zero frequency. If, for example, the motion compensation unit places the clutter at half the pulse repetition frequency, the feedback factor would then be a plus 1 and the subtractor unit 90 would be replaced by a full adder.

The value of N, the number of returns from the same range bin that are processed by the clutter rejection filter to produce a single output signal for each range bin, and the value of $a_n$, the weighting coefficients which determine the value of the scale factor utilized in the weighting function generator each pulse repetition period, may be determined generally by optimizing the moving-target gain of the processor. The movingtarget gain, G, is the ratio of the signal and clutter powers at the output of the digital clutter rejection filter to the ratio of the signal and clutter powers applied to the input of the clutter rejection filter or $G = (PS/PC)/(PS_{in}/PC_{in})$
where: $PS_{in} = \int S(f) \, df$, and $S(f)$ is the signal power spectrum of the moving target, and $f$ is the frequency;
$PC_{in} = \int C(f) \, df$, and $C(f)$ is the clutter power spectrum of the stationary targets;
$PS = \int S(f) \, |H(f)|^2 \, df$, where $|H(f)|^2$ is the power frequency response of the clutter rejection filter;
$PC = \int C(f) \, |H(f)|^2 \, df$, all the limits of the above integrals being $-\infty$ to $+\infty$. Since the power frequency response for a digital filter is $$|H(f)|^2 = \sum_{m=0}^{N-1} \sum_{n=0}^{N-1} a_m a_n \cos 2\pi (m-n) Tf$$

where $a_m$ and $a_n$ are the weighting coefficients and T is the interpulse period, the moving-target-indicator gain is $$G = \frac{\int S(f) \sum\sum a_m a_n \cos 2\pi(m-n) Tf df / \int C(f) \sum\sum a_m a_n \cos 2\pi(m-n) Tf df}{PS_{in}/PC_{in}}$$

or further condensed $$G = \frac{\sum\sum a_m A_{mn} a_n / \sum\sum a_m B_{mn} a_n}{PS_{in}/PC_{in}}$$

where $A_{mn} = \int S(f) \cos 2\pi (m-n) Tf df$
and $B_{mn} = \int C(f) \cos 2\pi (m-n) Tf df$. *Using the method of Lagrangian multipliers, the moving-target-indicator gain is maximized if the weighting coefficients, $a_n$, satisfy the equation*

$$\sum_{n=0}^{N-1} (A_{mn} - \mu B_{mn}) a_n = 0 \qquad (1)$$

for $n = 0, 1, \ldots N-1$. This equation can be satisfied only if the determinant $(A_{mn} - \mu B_{mn})$ is zero. To find the optimum weighting coefficients $a_n$, the Lagrangian multiplier $\mu$ must be found that lets the determinant vanish, this accomplished, the $a_n$ are readily determined from equation (1).

Table 1 lists filter design data for a typical system having a three degree antenna beamwidth with a desired moving processor gain, G, of 40 db (decibels). Since the spectral width of the clutter signal is a function of the $V |\sin \theta|$ the clutter rejection filters may be best mechanized for discrete ranges of $V |\sin \theta|$.

TABLE 1

| Row | | | | 0-80 | 80.1-160 | 160.1-320 | 320.1-400 | 400.1-440 |
|---|---|---|---|---|---|---|---|---|
| | | | | Filter Data | | | | |
| 1 | | $V\|$ | $\sin\theta\|$ | | | | | |
| 2 | Pulses processed in filter | N | | 3 | 4 | 6 | 9 | 16 |
| 3 | Weighting co-efficients ($a_n$) | $a_1$ | | 0.5046 | 0.3553 | 0.1816 | 0.0906 | 0.0414 |
| 4 | | $a_2$ | | 1 | 1 | 0.6084 | 0.3157 | 0.1171 |
| 5 | | $a_3$ | | 0.5046 | 1 | 1 | 0.6242 | 0.2386 |
| 6 | | $a_4$ | | | 0.3553 | 1 | 0.8933 | 0.4015 |
| 7 | | $a_5$ | | | | 0.6084 | 1 | 0.5885 |
| 8 | | $a_6$ | | | | 0.1816 | 0.8933 | 0.7716 |
| 9 | | $a_7$ | | | | | 0.6242 | 0.9183 |
| 10 | | $a_8$ | | | | | 0.3157 | 1 |
| 11 | | $a_9$ | | | | | 0.906 | 1 |
| 12 | | $a_{10}$ | | | | | | 0.9183 |
| 13 | | $a_{11}$ | | | | | | 0.7716 |
| 14 | | $a_{12}$ | | | | | | 0.5885 |
| 15 | | $a_{13}$ | | | | | | 0.4015 |
| 16 | | $a_{14}$ | | | | | | 0.2386 |
| 17 | | $a_{15}$ | | | | | | 0.1171 |
| 18 | | $a_{16}$ | | | | | | 0.0414 |
| 19 | Number of Filter outputs to be video integrated | $N_p$ | | 22 | 17 | 11 | 7 | 4 |
| 20 | $N_p/2$ | | | 11 | 8 | 6 | 4 | 2 |
| 21 | $T_h$ | | | 1.65 | 1.8 | 2.1 | 2.9 | 4.8 |

Referring to Table 1, row 1 lists the discrete intervals of values for which the rejection filter of the subject embodiment is to be mechanized. However, it will be understood that any number of discrete intervals could be selected depending on the desired system performance and complexity. Row 2 lists the minimum number of samples N for each range interval that are required to achieve the desired level of clutter rejection. Rows 3 through 18 tabulate the values of the weighting functions coefficients, $a_n$. For example, referring to the third column of Table 1, when the aircraft's velocity and the antenna's look angle are such that $V|\sin\theta|$ is between 80.1 to 160 feet per second, the shift register 94 (FIG. 6) will read out one set of range bin data every four transmission periods, i.e., N = 4. The gating circuit 100 will be activated during three consecutive transmission periods and the gating circuit 98 will be activated during one transmission period, each group of four transmitted pulses. Further, during every sequence of four transmission pulses, the received signal from the first transmission pulse of the sequence will be scaled by the factor of 0.3553, the second and third pulse periods by the scale factor 1.0000 and the fourth period by the scale factor of 0.3553, at which point the just described scale factor sequence will be repeated for the next four-pulse series.

Now that the significance of, N, the minimum number of consecutive returns from the same range bin that must be processed to achieve a desired degree of clutter rejection, has been explained, the program control units 74 may now be described in preparation for completing the explanation of the clutter rejection filter shown in FIG. 6. Referring now to the programmed controller 74, shown in block diagram form in FIG. 7, a suitable conventional analog multiplier 102 has the quantities V and $|\sin\theta|$ applied thereto from the air data computer 60 and the antenna control unit 44, respectively, (FIG. 1). The multiplier 102 forms the product $V|\sin\theta|$ which is applied to the input circuit of a sample and hold unit 104 which samples the input signal thereto in response to a gating pulse coupled through a differentiator 106. A signal $\bar{F}_2$, the mechanization of which will be described subsequently, is differentiated in the circuit 106 and a pulse is produced at the output of the differentiator which is coincident with the trailing edge of the signal $\bar{F}_2$. The trailing edge of the signal $\bar{F}_2$ occurs during the end of a processing series of the moving target processor of the subject invention, at which time the sample and hold circuit 104 samples the value of the quantity $V|\sin\theta|$ to determine the clutter characteristics which will control the next processing sequence.

The output signal from the sample and hold circuit 104 is coupled in parallel to five window detectors 108 through 112. As is well known in the art, window detectors produce a high-level output signal, which may be considered a binary "1," when the input signal applied thereto is between two preselected voltage levels and the window detector produces a low-level output signal, which may be considered a binary "0," when the input signal applied thereto is not between the two preselected voltage levels. Window detectors are well known in the art and may be mechanized by a positive and a negative comparator whose output terminals are coupled to the input circuits of an AND gate. Referring to Table 1, the output signal from the window detector 108 which is designated $W_3$ is at the 1 level for values of the quantity $V|\sin\theta|$ is between zero and 80 feet per second. The output signal from the window detector 109 which is designated $W_4$ is at the high-level state for values of the quantity $V|\sin\theta|$ between the ranges of 80.1 and 160.0 feet per second, and the other window detectors function in a similar manner to produce output signals $W_6$, $W_9$ and $W_{16}$ for values of the quantity $V|\sin\theta|$ which are indicated in Table 1 for values of N equal to 6, 9, and 16, respectively. It is noted that for the negligible case where the values of the quantity $V|\sin\theta|$ are between window detector ranges, for example, the value 80.5 feet per second, and ambiguity is created in the program controller unit. If it is desired to eliminate this slight probability of a processor completing an improper sequence, additional window detectors may be added to cover the value of $V|\sin\theta|$ between detector intervals. For example as shown in FIG. 8, a window detector 114 is mechanized for values of V | sin θ | between 80 and 80.1 feet per second and the output signal therefrom is combined in an OR gate 115 with the output signal of the window detector 108. The inverted output signal from the window detector 114 is ANDed with the output signal from the window detector 109 so that either signal $W_3$ or $W_4$ exclusively will be at the high-level or 1 state when the value of the quantity V| sin θ | is between the ranges of window detectors 108 and 109.

Figure 5:
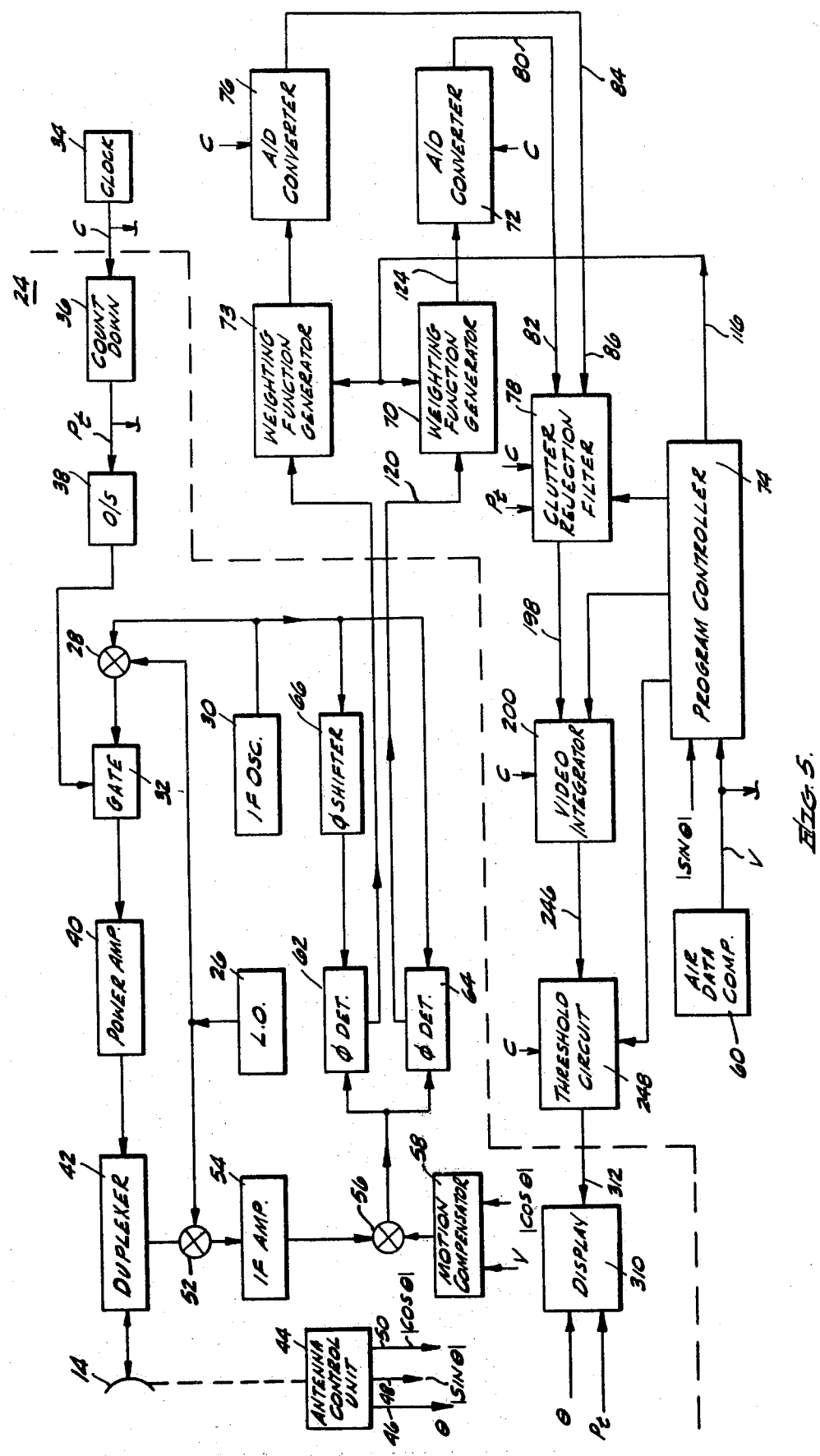
FIG. 5 is a block diagram of a moving target processor in accordance with the principles of the subject invention, and including a pulse radar system that may be associated therewith.

As shown in FIG. 5, the weighting function generators 70 and 73 are controlled by the output signals of a program controller 74 which are coupled thereto on a composite lead 116. Weighting function generators 70 and 73 are identical and their structure will be explained with reference directed primarily to FIGS. 5 and 9. Using the in-phase weighting function generator 70, as an example, the in-phase video from the phase detector 64 is coupled to an input terminal 120 (FIG. 9) through a resistor 122 to an output terminal 124. The scale factor between the in-phase video at the terminals 120 and 124 is determined by the scale factor networks 125 through 129. Referring to Table 1, for the case of the quantity V | sin θ | between the value zero and 80 feet per second, N is equal to 3 and the weighting function coefficients, $a_n$, are 0.5046, 1, and 0.5046. The signal $W_3$ from the program controller 74 is at the one level and a gate 130 is activated thereby and gates 131 through 134 are open. Therefore the scale factor applied by the weighting function generator for the example of N = 3 is determined by the ratio of the resistor 122 to the sum of the value of the resistors 136 and 138. Resistors 136 and 138 are selected so that when they both are in the circuit, the scale factor is a selected value which may be considered 1.0000 and that when resistor 138 is shorted out of the circuit, the normalized scale factor is 0.5046. The resistor 138 may be shorted by a gate circuit 140 which is activated by an OR gate 142, the input terminals thereto being coupled to first and third output terminal of a conventional ring counter 144. The ring counter 144 is a three-stage ring counter that has a 1 level output signal exclusively on one of the three output terminals and the 1 level signal progresses in a continuous sequence from terminal 1, to terminal 2 to terminal 3 back to terminal 1, with the shift in the 1 level between output terminals occurring each input pulse $P_t$. That is, at the start of each transmission period the shift pulse $P_t$ is coupled to the ring counter 144 from the output circuit of the countdown unit 36 of FIG. 5. The scale factor network 126 is mechanized in a similar fashion to that just described for the scale factor network 125, and for the case where quantity V | sin θ | is between the values 80.1 and 160 feet per second the gate 131 is activated by the signal $W_4$ from the program controller 74. The scale factor network 126 includes a four-stage ring counter 146 and the values of the scale factor coefficients $a_n$ listed in the fourth column of Table 1 are implemented by the resistors 148 and 150 in conjunction with the gating circuit 152, the OR gate 154 and the ring counter 146. In a similar manner, the values of the weighting function coefficients $a_n$ listed in Table 1, for N equal to 6, 9, and 16 are mechanized by the scale factor networks 127, 128 and 129, respectively.

Returning to the description of the clutter reject filter of FIG. 6, a counter 160 counts the number of transmitter synchronization pulses $P_t$ which are applied thereto from a countdown circuit 36 (FIG. 5). A plurality of leads 161 through 165 couple the terminals of the counter 160, which are at the 1 level when the counter 160 contains the count of 3, 4, 6, 9 and 16, respectively, to a plurality of AND gates 170 through 174, respectively. AND gates 170 through 174 are controlled by the signals $W_3$, $W_4$, $W_6$, $W_9$ and $W_{16}$, respectively, and the output terminals of the AND gates 170 through 174 are applied to input terminals of an OR gate 176. The counter 160 is reset to a zero count by the output signal of the OR gate 176 which is applied to a reset input terminal of the counter 160. Therefore, the counter 160 functions as a 3, 4, 6, 9 or 16 pulse counter, depending on the value of the W output signals provided by the program controller 74.

An output terminal of the counter 160 which is at the 1 level during the time period that the counter contains a count of 1 is applied to a set input terminal of the flip flop 102 and the flip flop 102 is reset by the signal applied from the output terminal of the OR gate 176.

Waveforms 180 and 182 of FIG. 10 depict the waveshape of the signals $F_1$, and $\overline{F}_1$ for the case of a quantity V | sin θ | in the range of 80.1 to 160 feet per second (where N is equal to 4). As shown by the waveform 180, signal $F_1$ is at the high level or 1 state during three consecutive transmission interpulse periods and is at the low level state during the fourth transmission interpulse period. The waveform 182 (signal $\overline{F}_1$) is shown as the complement of the waveform $F_1$. The interpulse period, T, is the time period between the $P_t$ pulses shown by a waveform 184 of FIG. 10. Therefore, for the case of N = 4, a gating circuit 100 of FIG. 6 applies the parallel binary words that are shifted out of the shift register 94 to the subtrahend input circuit of the subtraction network 90 during the three transmission interpulse periods that the signal $F_1$ is at the 1 level. Gating circuit 98 applies the output words from the shift register 94 to a first input circuit of the adder 96 during the interpulse period each sequence that the signal $\overline{F}_1$ is at the 1 level.

The digitized quadrature video is processed by a subtractor 180 and a shift register 182 and by gating circuits 184 and 186 in an identical manner to that described for the in-phase video, and is then applied as digital words in a parallel format to a second input circuit of the adder 96. The adder 96 may be a clocked digital full adder which forms a sum of the absolute value of the two digital signals applied thereto each clock period. The output signal from the adder 96 is a sequence of digital parallel words where each word is representative of the amplitude of the moving target signals and noise signal contained in a particular range bin; the clutter signals having been substantially cancelled by the subtractor shift register feedback loop.

Referring momentarily to FIG. 5, the output signal from the clutter rejection filter 78 is applied on a composite lead 198 to a video integrator 200. The function of the video integrator is to improve the moving-target signal-to-noise ratio and thereby to increase the probability of detection of moving targets. The more filter outputs that are integrated, the greater is the signal-to-noise ratio improvement. For $N_o$ transmitted pulses on target, $N_p$ (which is equal to $N_o/N$) filter outputs can be video integrated. $N_o$ is a function of the antenna scan rate and the pulse repetition frequency of the radar. For example, with a pulse repetition rate of 2000 cycles per second and an antenna scan rate of 90 degrees per second and with a 3 degree antenna beamwidth, $N_o$ would be 67 pulses on target. The value of $N_p$, for the different values of N selected for description in the subject embodiment are listed in Row 19 of Table 1.

It should be noted that by minimizing N through optimum amplitude weighting in accordance with the principles of the subject invention, $N_p$ is maximized and consequently maximum signal-to-noise ratio improvement by video integration is obtained.

A first type video integrator that may be utilized in accordance with the principles of the subject invention is shown in block diagram form in FIG. 11. The digital data words from the output circuit of the clutter rejection filter 78 are applied to the input circuits of full adders 202 and 204. The output data words from the adder 202 are applied to a shift register 206 which has its output circuit coupled to a switching network indicated by the composite switch 208. The shift register 206 may be the same type as the shift register 94 of FIG. 6. Digital words are coupled through the switch 208 either to a composite output lead 210 or to a second input circuit of the adder 202. The shift register 212 and the composite switch 214 are connected in an identical manner to that described for the register 206 and the switch 208. The composite switches 208 and 214 are shown as simple mechanical switches for clarity of explanation and it will be understood that in reality they comprise a plurality of electronic gates such as the gating circuits 98 and 100 of FIG. 6. The video integrator of FIG. 11 operates on the same principle as does the clutter rejection filter of FIG. 6 in that it simply sums up $N_p$ filter outputs (each output sequence containing 1,250 data words corresponding to 1250 range bins) after which the video memory is cleared. In order to minimize losses due to noncoincidence of the video integrator processing intervals and the time interval during which the target is in the radar beam, two parallel video integrators with mutually displaced integration intervals are provided by operating the switches 208 and 214 alternately every $N_p/2$ filter outputs. The integration function provided by the video integrator of FIG. 11 may best be mechanized by a single video integrator summing $N_p/2$ filter outputs and a memory retaining the previous video integrator output so that the current and the previous video integrator outputs can be summed every $N_p/2$ pulses as shown by the video integrator of FIG. 12 which is the functional equivalent of the video integrator shown in FIG. 11.

Figure 12:
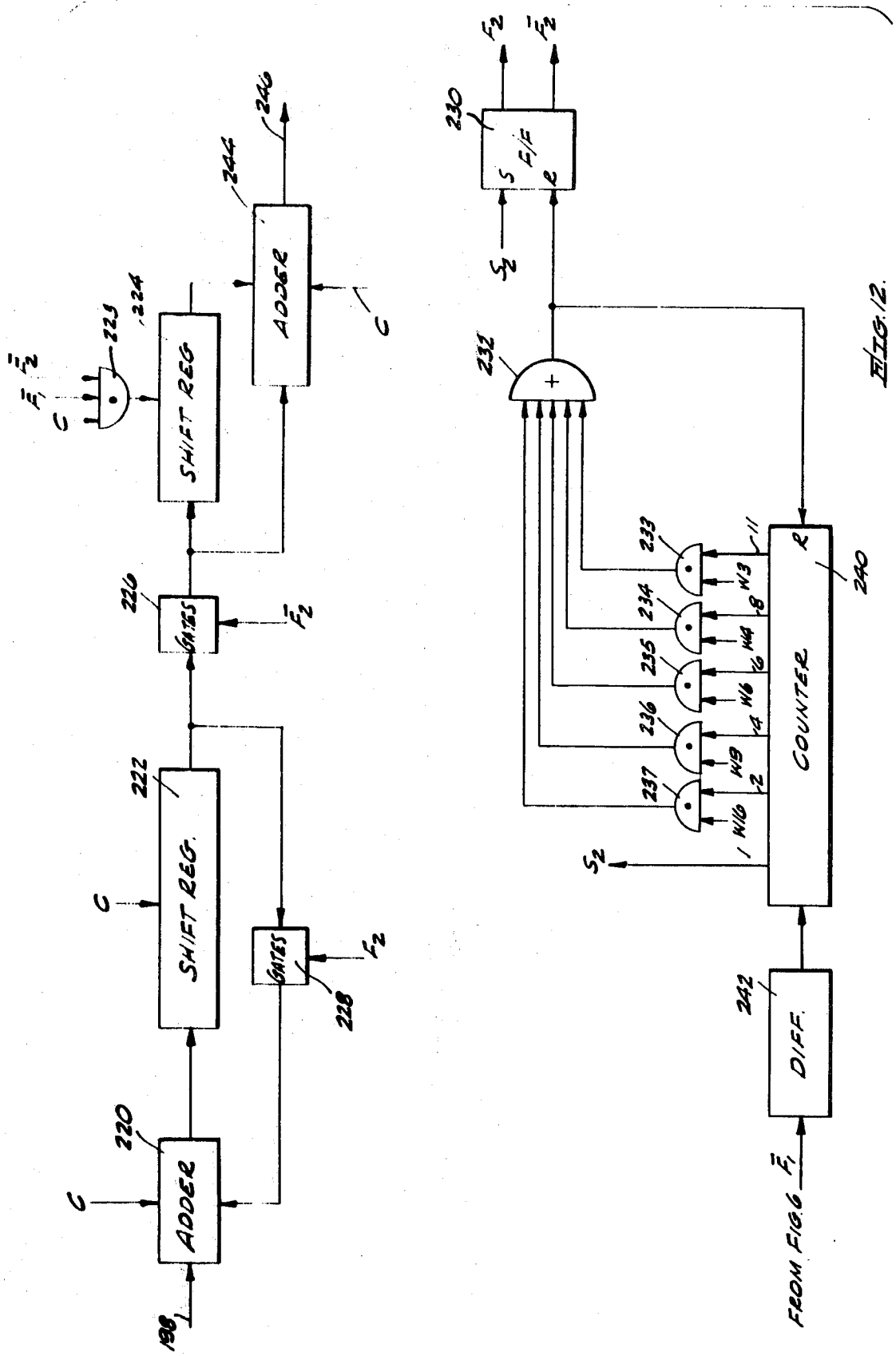
FIG. 12 is a block and schematic diagram of a second type of digital integrator which may be utilized in moving target processor of FIG. 5.

Referring primarily to FIG. 12, the digitized output signal from the clutter rejection filter 78 (FIG. 1) is applied as a sequence of parallel binary words to a clocked adder 220 of FIG. 12. The output signal from the adder 220 is processed by shift register 222 in a manner similar to that described for the shift register 94, FIG. 6. An output signal from the shift register 222 is exclusively applied either to the input circuit of a shift register 224 or to a second input circuit of an adder 220 by the gating circuits 226 and 228, respectively. The gating circuits 226 and 228 may be identical to the gating circuits 98 and 100 of FIG. 6 and they are controlled by control signals $\overline{F}_2$ and $F_2$, respectively. The gating circuit 226 is activated and the gating circuit 228 is inhibited during one filter output period each $N_p/2$ filter output period.

The signals $F_2$ and $\overline{F}_2$ are generated by a flip flop 230 that is reset by the output signal of an OR gate 232. The input signals of the OR gate 232 are applied from the plurality of gates 233 through 237. The AND gates 233 through 237 are mechanized in association with a counter 240 to form a variable readout counter in the same manner as described for counter 160 of FIG. 6. The counter 240 counts the signal output periods of the clutter rejection filter 78 as represented by input pulses applied thereto from a differentiator 242 which differentiates the clutter rejection filter read out control signal $\overline{F}_1$ (FIG. 6). An output signal from the first stage of the counter 240, designated $S_2$, is at the 1 level when the counter contains the count of 1 and the signal $S_2$ is applied to the set input terminal of the flip flop 230. The flip flop 230, and the counter 240 are reset by the output signal of the OR gate 232 every $N_p/2$ output periods of the clutter reject filter 78. The AND gates 233 through 237 are so mechanized in association with the OR gate 232 that the OR gate 232 provides a reset output pulse every $N_p/2$ transmission periods, in response to the W signals provided by the program controller 74. The values of the quantity $N_p/2$ for the corresponding values of N of the subject embodiment are listed in row 20 of Table 1.

The binary words, which are shifted out of the shift register 224, are summed in a full adder 244 and the output signal therefrom is coupled to a mean level digital threshold detector circuit 248 (FIG. 5). The adder 244 sums the current read out of the gating circuits 226 to the previous read out which is stored in a shift register 224 every $N_p/2$ time periods so as to minimize losses due to noncoincidence of the integration processing interval and the time interval during which the target is in the radar beam. The binary data words stored in the shift register 224 advance one stage at a time in response to a shift signal applied from an AND gate 223. The signals C, $\overline{F}_1$, and $\overline{F}_2$ are applied to the input terminals of the AND gate 223 so that the shift register 224 shifts each clock pulse only during the period that data is being read through the gating circuits 226. Therefore the shift register 224 stores the binary words representing the moving target and noise signals for each of a plurality of range bins of the preceding read out interval of the gating circuit 226.

Waveforms 250 and 252 of FIG. 13 show the voltage versus time plots of the signals $F_2$ and $\overline{F}_2$, respectively. For the case of N equal to 4 and $N_p/2$ equal to 8, a waveform 254 represents the signal $\overline{F}_1$ at a contracted time scale, which waveform serves as a time reference for understanding the waveforms 250 and 252. It will be recalled that during the time periods that the signal $\overline{F}_1$ is at the high level that the data words corresponding to the signal and noise characteristics of the plurality of range intervals are sequentially read out of the clutter rejection filter 78. For the case N equal to 4, the gating circuit 228 is closed for seven read out periods of the clutter rejection filter and the adder 220, shift register 222 and gating circuits 228, function as a digital integrator. For one clutter reject filter readout period out of each sequence of eight, the gating circuits 226 are closed and the gating circuits 228 are opened in response to the signals $F_2$ and $\overline{F}_2$, respectively, during which period the integrated data words are applied to the shift register 224.

A third type of video integrator 200 which may be utilized in the system of the subject invention is shown in FIG. 14. The output data words from the clutter rejection filter 78 are applied on a composite lead 198 to an adder 260, the output of which is applied to an input circuit of a clocked shift register 262. The output data words from the shift register 262 are applied to the composite output lead 246 as well as to a feedback multiplier 264. The multiplier 264 multiplies the input data words thereto by feedback coefficient K; where K is approximately equal to $(N_p-1)/N_p$, and the product formed thereby is applied to the second input terminal of the adder 260. A parallel format digital word corresponding to the correct feedback factor K is applied to multiplier 264 on a composite lead 266 from a plurality of gating circuits 268 through 272; which gating circuits are controlled by the W signals generated by the program controller 74. A plurality of read out only registers 274 through 278, where each register may consist of a switching circuit for each bit, are programmed to contain the correct digital value of K for the different values $N_p$ listed in Table 1. Each register is coupled to the appropriate gating circuit (268 through 272) which is controlled by the corresponding W signal for the $N_p$ case for which the register had been preprogrammed.

Figure 15:
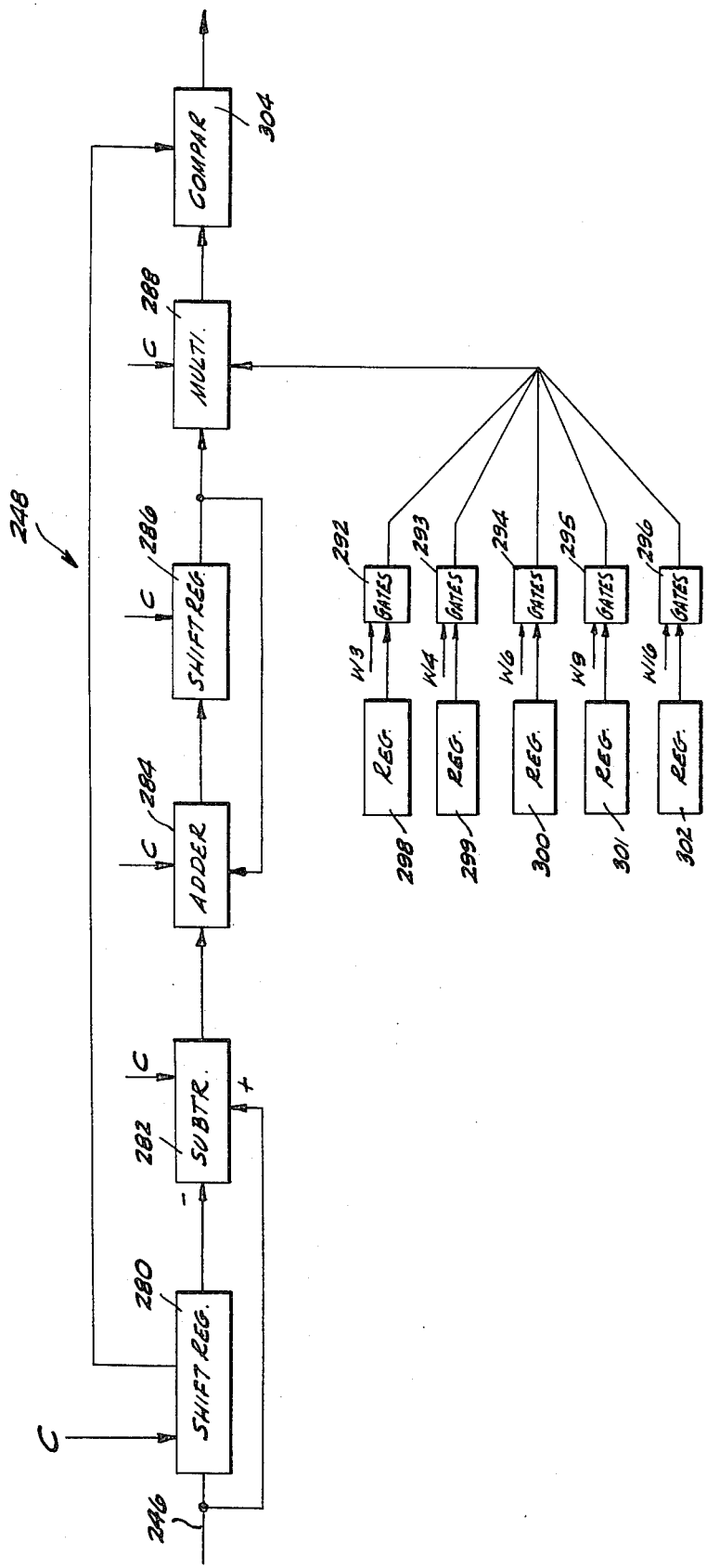
FIG. 15 is a block diagram of a digital mean-level threshold detector which may be utilized in the moving target processor shown in FIG. 5.

The binary words representative of the moving target and noise signals for each of the plurality of range bins are sequentially shifted out of the video integrator 200 on the composite lead 246 to a digital mean level threshold detector 248, which threshold detector is shown in greater detail in FIG. 15. Since the noise signal amplitude varies as a function of the number of clutter rejection filter output periods integrated, the threshold of the detector is adapted as a function thereof. Also, as is well known in the art, the noise threshold level varies due to numerous radar parameters and variations in the aircraft's flight profile so that the detector's threshold is also adapted to vary as a function of the mean level of the noise signal contained in M adjacent range bins so as to compensate for noise power or clutter feedthrough power variations. In the mean level threshold detector, shown in FIG. 15, a running sum of the integrator 200 output signals for M adjacent range bins is formed by continually adding the output signal of a currently processed range bin while subtracting the output signal associated with the $M^{th}$ preceding range bin. Briefly, the digital mean level threshold detector consists of an M word shift register and a summing means in association with a one-word shift register. A threshold is formed by multiplying the resulting mean level by a constant depending on the number of clutter rejection filter outputs integrated. The digital data word contained in the center stage of the M stage shift register is taken from a tap at the center of shift register and compared with the computed threshold. The numerical value assigned to M, that is, the number of range bins used to form a mean value of the threshold, is determined by the degree of accuracy and system complexity desired. For example, M may be equal to 32.

Referring now primarily to FIG. 15, the binary data words which are representative of moving target signals and noise contained in each of a plurality of range bins are sequentially shifted out of the video integrator 200 on the composite lead 246 to the digital theshold detector 248. The data words, transmitted on the composite lead 246, are applied in parallel to a clocked M stage shift register 280 and to a subtrahend input circuit of a subtractor 282. The data words which are shifted out of the shift register 280 are applied to a minuend input circuit of the subtractor 282. The difference signals provided by the subtractor are applied to one input of a digital adder 284 which has a sum circuit coupled to the input circuit of a onestage shift register 286. The output data words from the shift register 286 are applied in parallel to a second input circuit of the adder 284 and to a digital multiplier 288. The multiplier 288 multiplies the output data words from the shift register 286 by a factor $T_h$, applied on a composite lead 290 from a plurality of gating circuits 292 through 296. A plurality of read only registers 298 through 302 are coupled to gating circuits 292 through 296 and the gating circuits are controlled by the W signals in an identical manner to that described for the similar circuits shown in FIG. 14. The $T_h$ value, stored in each of the registers for the different values of N, are listed in row 21 of Table 1, and these values in general may be calculated by the method outlined in and shown by a curve 35 of a report "A Statistical Method of Radar Detection," RM-0753 by Marcum, Rand Corporation. The product from the multiplier 288 is applied to a digital comparator 304 as the reference level therefor. The data words from a tap, M/2, from the center of the shift register 280 are compared in the comparator 304 against the reference level applied thereto. When the digital value of the data words exceeds the reference values $T_h$, a high level pulse is generated by the comparator 304, which pulse is representative of the fact that the range bin currently stored in the M/2 stage of the shift register 280 contains a moving target.

The output signal from the threshold circuit 248 is applied to an intensity input circuit 312 of a display device 314. The display device 314, as is well known in the art, may be synchronized by the transmission synchronization pulses $P_t$ and the azimuth angle signal $\theta$ so as to display the moving target signal (output signal from the comparator 304) as a function of the target's range and azimuth coordinate.

The moving target processor of the subject invention comprises weighting function generators 70 and 73, a single digital clutter rejection filter 78, a digital video integrator 200 and a digital mean level threshold detector 248, all of which units are adaptable to change their characteristics in accordance with the spectral width of the received clutter signal spectrum. The clutter-signal spectral width is predicted by a program controller 74 on the basis of the quantity $V |\sin \theta|$ and the program controller develops W control signals which program the desired response of the just described adaptable units of the moving target processor in accordance with the principles of the invention.

Clutter rejection is performed in the clutter rejection filter 78 by superposition with alternate signs of N subsequent returns from the same range bin (FIG. 6). The number of pulse repetition periods processed, N, is kept to a minimum by optimumly weighting the range bin return in the weighting function generators 70 and 73. The summation performed in the clutter rejection filter is provided by a digital accumulation circuit consisting basically of a digital delay line (shift register) with a feedback path of a gain of minus one. The superposition of the digitized range bin signal returns thus reduces to a simple accumulation involving only subtraction. This accumulation is carried out once for every N transmission periods so that the clutter rejection filter 78 provides an output sequence of signals only once every N transmission periods. It is important to note that the clutter rejection filter requires only a single digital delay line per channel, thereby minimizing the digital storage requirement to one word per range bin per channel. It is also important to note that by minimizing N, for a desired degree of clutter rejection, more clutter rejection filter output sequences may be integrated by the digital video integrator 200 for a given time on target and, therefore, the signal to noise ratio is maximized.

Three types of video integrators have been disclosed, and with $N_o$ pulses on target, $N_p$ equal to $N_o/N$, filter outputs may be video integrated thereby. Minimizing N (number of returns processed in the filter) results in maximizing $N_p$ and consequently in maximizing the signal to noise power ratio by video integration.

As shown in FIG. 11, in order to minimize losses due to noncoincidence of the video integrator processing interval and the time interval during which the target is in the radar beam, two parallel video integrators with displaced integration periods are provided. FIG. 12 shows a more practical mechanization of the function performed by the integrator of FIG. 11 and comprises a signal video integrator summing $N_p/2$ filter outputs and a memory unit which retains the previous video integrator output so that the current and previous video integrator outputs can be summed every $N_p/2$ pulses. A third type of video integrator is shown in FIG. 13, and it comprises a feedback circuit which is updated every filter output and it incorporates a variable feedback coefficient concept where K is equal to $(N_p-1)/N_p$.

The mean level threshold detector circuit 248 (FIG. 14) samples the mean value of the clutter plus noise power contained in M range bins adjacent to a range bin being analyzed and forms a threshold level as a function thereof and of the number of pulses integrated by the integrator 200. The threshold is utilized by a comparator circuit that compares the digital value of the signal contained in the range bin to be analyzed to the digital value of the threshold and generates an output signal when the sampled range bin exceeds the threshold value. The output signal for the comparator is representative of a selected probability that the digital data words contain a moving target signal as well as noise content.

The pulses produced by the threshold circuit 248 are applied to a display unit 310 whereby they are displayed in the proper range and azimuth position.

Thus there has been described a new and unique moving target processor which utilizes simple digital processing techniques to obtain a desired degree of clutter signal rejection while maximizing signal to noise ratio. Although but one preferred embodiment has been described herein, it will be obvious to those skilled in the art that many changes and modifications may be applied hereto while remaining within the scope of the concepts of this invention. For example, numerous timing mechanizations and sequences can be utilized and negative rather than positive gating logic could be incorporated. Also, in the preferred embodiment disclosed herein, the delay means utilized by the clutter rejection filter 78, the video integrator 200 and threshold circuit 248 have been described as digital shift registers; however, it will be obvious to those skilled in the art that the novel digital processor of the subject invention may be mechanized by digital memories programmed to perform equivalent functions.

What is claimed is:

1. A moving target processor for analyzing in-phase and quadrature received signals from a pulsed radar system comprising:

program control means for generating a control signal which is representative of predicted spectral characteristics of the in-phase and quadrature received signals;

weighting means for processing the in-phase and quadrature received signals therethrough with a variable gain programmed in response to the control signal; and means for filtering the weighted received in-phase and quadrature signals, said filtering means having a variable frequency response programmed in response to the control signal.

2. The processor of claim 1 further comprising integrator means for integrating the filtered signal generated by said filter means, said integrator means having an integration time period which is variable in response to the control signal.

3. The processor of claim 2 further comprising detector means for comparing the integrated signals, generated by said integrator means, to a threshold signal level, said detector means including means for varying the threshold signal level in response to the control signal.

4. An adaptive moving target processor for discriminating between stationary and moving targets, located at a plurality of range intervals, in response to in-phase and quadrature received signals coupled thereto from a receiver having in-phase and quadrature output circuits, comprising:

a program controller for generating control signals representative of the spectral width of the in-phase and quadrature received signals corresponding to stationary targets;

a first weighting function generator having an input circuit coupled to the in-phase output circuit of said radar receiver, having a weighting generator control input circuit coupled to said program controller, and having a weighted in-phase signal output circuit;

a second weighting function generator having an input circuit coupled to the quadrature output circuit of said radar receiver, having a weighting generator control input circuit coupled to said program controller and having a weighted quadrature signal output circuit; and an adaptive clutter rejection filter having first and second input circuits coupled to said weighted in-phase and quadrature signal output circuits, respectively, having a filter control input circuit coupled to said program controller, and having an output circuit.

5. The processor of claim 4 wherein said adaptive clutter rejection filter comprises:

first delay means for superpositioning N successive weighted in-phase signals, from the same range interval for each of a plurality of range intervals, where the value of the number N is controlled in response to the control signals from said program controller, and said delay means having an output circuit;

second delay means for superpositioning N successive weighted quadrature signals, from the same range interval for each of a plurality of range intervals, where the value of the number N is controlled in response to the control signals from said program controller, and said delay means having an output circuit; and summation means, coupled to the output circuits of said first and second delay means, for generating a signal proportional to the absolute magnitude of the sum of the signals applied thereto.

6. The processor of claim 5 wherein said received signals are coupled from a system having an antenna for radiating energy in a pattern and said program controller comprises means for controlling the control signal as a function of the doppler frequency shift across the antenna pattern.

7. An adaptive moving target processor for discriminating between stationary and moving targets in response to received in-phase and quadrature signals from a plurality of range intervals coupled from a receiver having in-phase and quadrature output circuits comprising:
- a program controller for generating control signals representative of the spectral width of the received in-phase and quadrature signals corresponding to stationary targets;
- a first weighting function generator having an input circuit coupled to the in-phase output circuit of said radar receiver, having a weighting generator control input circuit coupled to said program controller, and having a weighted in-phase signal output circuit;
- a second weighting function generator having an input circuit coupled to the quadrature output circuit of said radar receiver, having a weighting generator control input circuit coupled to said program controller, and having a weighted quadrature signal output circuit;
- a first analog-to-digital converter having an input circuit coupled to said weighted in-phase signal output circuit of said first weighting function generator and having an output circuit;
- a second analog-to-digital converter having an input circuit coupled to said weighted quadrature signal output circuit of said second weighting function generator and having an output circuit; and
- an adaptive clutter rejection filter having first and second input circuits coupled to said first and second analog-to-digital converter output circuits respectively, having a filter control input circuit coupled to said program controller, and having a signal output circuit.

8. The processor of claim 7 wherein said adaptive clutter rejection filter includes first and second filter units coupled to said first and second rejection filter input circuits respectively, said filter units each having an output circuit coupled to a summation circuit and where each of said filter units comprises:
- a digital subtractor having a first input circuit coupled to the input circuit of said adaptive clutter rejection filter, having a second input circuit and having a difference output circuit;
- digital delay means having an input circuit coupled to said difference output circuit of said subtractor and having an output circuit;
- a filter gating circuit having an input circuit coupled to the output circuit of said digital delay means, having a first output circuit, having a second output circuit coupled to said second input circuit of said subtractor and having a filter gate control input circuit; and
- a filter control circuit having an output circuit coupled to said filter gate control input circuit and having an input circuit coupled to said program controller.

9. The processor of claim 8 wherein said digital delay means includes a multi-bit shift register having a plurality of stages and the number of stages being equal to the number of range intervals processed by said processor.

10. The processor of claim 8 wherein said digital delay means includes a multi-bit shift register having a plurality of stages; the number of stages in said shift register being essentially equal to, and less than twice, the number of range intervals processed by said processor.

11. The processor of claim 8 wherein said digital delay means includes a digital memory device with a storage capacity of essentially twice, and less than four times, the number of range intervals to be processed.

12. The processor of claim 7 further comprising an integrator unit having a signal input circuit coupled to the signal output circuit of said adaptive clutter rejection filter, having an integration control input circuit coupled to said program controller and having an output circuit.

13. The processor of claim 12 wherein said integrator unit comprises first and second digital integrators with mutually displaced integration intervals, with each digital integrator providing integrated output signals alternately every $N_p/2$ filter outputs and with $N_p$ being controlled in response to the control signal coupled from said program controller.

14. The processor of claim 12 wherein said integrator unit comprises:
- a first digital adder having a first input circuit coupled to the signal input circuit of said integrator unit having a second input circuit and having a sum output circuit;
- a first shift register having an input circuit coupled to the sum circuit of said first digital adder and having an output circuit;
- an integrator gating circuit having a first output circuit coupled to the second input circuit of said first adder, having a second output circuit, having an input circuit coupled to the output circuit of said first shift register, and having an integrator gating control input circuit;
- a second digital adder having first and second input circuits and having a sum output circuit;
- a second shift register having an input circuit coupled to the second output circuit of said integrator gating circuit and to the first input circuit of said second adder and having an output circuit coupled to the second input circuit of said second adder; and
- an integration control circuit having an output circuit coupled to said integrator gating control input circuit and having an input circuit coupled to said program controller.

15. The processor of claim 12 further comprising a mean-level threshold detector having a signal input circuit, a signal output circuit and a threshold control circuit coupled to said program controller.

16. The processor of claim 12 further including a mean-level threshold detector comprising:
- means, coupled to the output circuit of said integrator unit, for generating a threshold signal representative of the mean value of the output signal of said integrator unit;
- delay means for delaying the output signal of said video integrator, said delay means having an input circuit coupled to said output circuit of said video integrator and having an output circuit;

a comparator having a signal input circuit coupled to the output circuit of said delay means, having a threshold input circuit, and having an output circuit; and variable multiplier means for varying the gain therethrough in response to said program controller, said multiplier means being coupled between the output circuit of said means for generating a threshold signal and the threshold input circuit of said comparator.

17. In combination with a pulsed radar system, mounted on a vehicle capable of moving at a velocity V, and having an antenna for radiating energy at an angle $\theta$ relative to the direction of motion of said vehicle, a moving target processor for discriminating moving targets from stationary targets in each of a plurality of range intervals in response to received in-phase and quadrature signals from a radar receiver having in-phase and quadrature output circuits comprising:

a program controller for generating control signals indicative of the spectral width of the received signals corresponding to stationary targets, said program signals being a function of the velocity V and angle $\theta$;

a first weighting function generator having an input circuit coupled to the in-phase output circuit of said radar receiver, having a weighting generator control input circuit coupled to said program controller, and having a weighted in-phase signal output circuit, said first weighting function generator including means for processing the received video therethrough with a variable preprogrammed gain each radar transmission period in response to said control signal;

a second weighting function generator having an input circuit coupled to the quadrature output circuit of said radar receiver, having a weighting generator control input circuit coupled to said program controller, and having a weighted quadrature signal output circuit, said second weighting function generator including means for processing the received video therethrough with a variable preprogrammed gain each radar transmission period in response to said control signal;

a first analog-to-digital converter having an input circuit coupled to said weighted in-phase signal output circuit of said first weighting function generator and having an output circuit;

a second analog-to-digital converter having an input circuit coupled to said weighted quadrature signal output circuit of said second weighting function generator and having an output circuit;

an adaptive digital clutter rejection filter having first and second input circuits coupled to said first and second analog-to-digital converter output circuits, respectively, having a filter control input circuit coupled to said program controller, and having a signal output circuit, said adaptive digital clutter rejection filter comprising digital filter means for superpositioning, with alternating polarity, N successive weighted in-phase and quadrature signals from the same range interval of each of a plurality of range intervals, and where the value of the number N is controlled in response to the control signals coupled from said program controller;

an integrator having a signal input circuit coupled to the signal output circuit of said adaptive digital clutter rejection filter, having an integration control input circuit coupled to said program controller and having an output circuit; and a mean level threshold detector having a signal input circuit coupled to the output circuit of said integrator, a signal output circuit and a threshold control circuit coupled to said program controller.

* * * * *